(12) United States Patent
Iyer

(10) Patent No.: US 11,926,573 B2
(45) Date of Patent: Mar. 12, 2024

(54) METHOD OF PREPARING A MICRONIZED SULPHUR FERTILIZER PRODUCT WITH UREA

(71) Applicant: Sulvaris Inc., Calgary (CA)

(72) Inventor: Satish Iyer, Calgary (CA)

(73) Assignee: Sulvaris Inc., Calgary (CA)

( * ) Notice: Subject to any disclaimer, the term of this patent is extended or adjusted under 35 U.S.C. 154(b) by 0 days.

(21) Appl. No.: 17/658,556

(22) Filed: Apr. 8, 2022

(65) Prior Publication Data

US 2022/0324771 A1 Oct. 13, 2022

Related U.S. Application Data (60) Provisional application No. 63/173,409, filed on Apr. 10, 2021.

(51) Int. Cl.
*C05G 5/12* (2020.01)
*B01J 2/06* (2006.01)
*C05C 9/00* (2006.01)

(52) U.S. Cl.
CPC ........ *C05G 5/12* (2020.02); *B01J 2/06* (2013.01); *C05C 9/005* (2013.01)

(58) Field of Classification Search
CPC ......... B01J 2/04; B01J 2/06; B01J 2/12; B01J 2/14; B01J 2/16; C05G 5/12; C05C 9/00; C05C 9/005; C05D 9/00
See application file for complete search history.

(56) References Cited

U.S. PATENT DOCUMENTS

| | | | |
|---|---|---|---|
| 4,330,319 A * | 5/1982 | Bexton | C05C 9/005 71/64.13 |
| 8,679,446 B2 | 3/2014 | Iyer | |
| 9,278,858 B2 | 3/2016 | Iyer | |
| 2017/0210675 A1* | 7/2017 | Allais | C05G 5/12 |

FOREIGN PATENT DOCUMENTS

WO 2020/132746 A1 7/2020

OTHER PUBLICATIONS

International Search Report for International Application No. PCT/CA2022/050548, dated Aug. 1, 2022, 5 pages.
International Written Opinion for International Application No. PCT/CA2022/050548, dated Aug. 1, 2022, 4 pages.

* cited by examiner

*Primary Examiner* — Mary Lynn F Theisen
(74) *Attorney, Agent, or Firm* — TraskBritt (57) ABSTRACT

A process for the production of elemental sulphur-urea fertilizer products is described, comprising the preparation of molten urea; preparing a suspension of micronized sulphur particles with water; mixing the molten urea with suspension of micronized sulphur particles with water wherein the micronized sulphur particles substantially remain in micronized solid state; and spraying the mixture of molten urea and suspension of micronized sulphur particles with water into a granulator, wherein the water in the mixture is flashed off, resulting in the formation of sulphur-urea granules with an even distribution of urea and micronized sulphur particles. An elemental sulphur-urea fertilizer composition obtained by the process is also described.

10 Claims, 4 Drawing Sheets

METHOD OF PREPARING A MICRONIZED SULPHUR FERTILIZER PRODUCT WITH UREA

CROSS-REFERENCE TO RELATED APPLICATION

This application claims the benefit under 35 U.S.C. § 119(e) of U.S. Provisional Patent Application Ser. No. 63/173,409, filed Apr. 10, 2021, the disclosure of which is incorporated herein in its entirety by this reference.

TECHNICAL FIELD

The present invention relates to a process for the preparation of a micronized sulphur compositions with urea, for use for example as fertilizers.

BACKGROUND

Urea and sulphur are commonly used in fertilizer compositions to provide essential nutrients for plant growth. Fertilizer products have been commonly manufactured by mixing elemental sulphur or micronized sulphur with urea as a primary macronutrient.

Elemental sulphur in fertilizer is oxidized slowly in the soil as the process is dependent upon microbial colonization and activity. Use of micronized sulphur tends to be desirable as increased oxidation rate results from smaller sulphur particles due to increased surface area available for microbial colonization.

Typical urea and sulphur fertilizer manufacturing process involves mixing of molten urea with molten elemental sulphur and spraying the suspension into a granulator (rotating drum, pan or fluidized bed granulator) for formation into granules upon cooling.

Mixing molten urea with molten elemental sulphur typically results in fertilizers with large globules of sulphur, rather than a homogeneous distribution of small micronized sulphur in the fertilizer granules.

Mixing molten urea with solid micronized sulphur typically results in melting of the sulphur particles, destroying the small size of sulphur particles and prevents homogeneous distribution of sulphur particles in the fertilizer granules.

Other methods of incorporating sulphur onto fertilizers include spraying elemental sulphur on the outside of the urea granule after it is formed by granulation to form sulphur coated urea, which again prevents homogeneous distribution of sulphur throughout granules.

Accordingly, there is a need for an improved method of producing fertilizers with urea and micronized sulphur with greater homogeneity in distribution of small sulphur particles.

BRIEF SUMMARY

In various aspects the present invention provides methods for the production of urea and micronized sulphur granules, and sulphur-urea fertilizer compositions.

In an embodiment, there is a method for the production of urea and micronized sulphur granules, comprising:
  a) preparing and maintaining molten urea at a suitable temperature for injection into a granulator;
  b) preparing and maintaining a suspension of micronized sulphur particles with at least 20% water (wt.) content, with a relatively uniform micronized particle size distribution, for injection into the granulator;
  c) prior to injection into the granulator, combining the urea and micronized sulphur suspension, wherein the water content of the suspension cools the mixture of urea and micronized sulphur suspension, and the micronized sulphur particles substantially remain in solid state; and
  d) spraying the mixture of urea and micronized sulphur suspension into a granulator using a nozzle where about 20% (wt.) of the water content in the mixture of urea and micronized sulphur suspension is flashed off, wherein the granulator forms micronized sulphur-urea granules with a relatively uniform distribution of urea and micronized sulphur particles.

The method may include combining the urea and micronized sulphur suspension in a tee connection prior to injection into the granulator. The method may include maintaining the molten urea at a temperature of at least 135° C. before combination with the micronized sulphur suspension. The method may include maintaining the micronized sulphur suspension at a temperature that is at least the melting point of sulphur before combination with molten urea.

The micronized sulphur particles may have an average diameter of less than about 30 microns, preferably less than about 7 microns, and more preferably less than about 5 microns.

After being formed in the granulator, the sulphur-urea granules may be in substantially solidified form without the need for a dedicated drying equipment. Some additional heat may be added into the existing system in order to complete the drying process.

In another embodiment, there is a sulphur-urea fertilizer composition obtained or obtainable by:
  a) preparing and maintaining molten urea in a urea reactor at a suitable temperature for injection into a granulator;
  b) preparing and maintaining a suspension of micronized sulphur particles with at least 20% water (wt.) content, with a relatively uniform micronized particle size distribution, for injection into the granulator;
  c) prior to injection into the granulator, combining the urea and micronized sulphur suspension, wherein the water content of the suspension cools the mixture of urea and micronized sulphur suspension, and the micronized sulphur particles substantially remain in solid state;
  d) spraying the mixture of urea and micronized sulphur suspension into a granulator using a nozzle where about 20% (wt.) of the water content in the mixture of urea and micronized sulphur suspension is flashed off, wherein the granulator forms micronized sulphur-urea granules with a relatively uniform distribution of urea and micronized sulphur particles; and
  e) forming the granules of sulphur-urea fertilizer composition without a further drying step in a dedicated drying equipment, wherein the granulator forms sulphur-urea granules with a relatively uniform distribution of urea and micronized sulphur particles.

The embodiments tend to enable the preparation of sulphur-urea containing fertilizer products in which the micronized sulphur particles have a desired small size and relatively homogeneous distribution, by avoiding the melting or forming of larger globules of sulphur.

In the embodiments, the presence of water in the mixture of urea and micronized sulphur particles tends to provide a temperature decrease upon combination of the molten urea with the micronized sulphur suspension. The water content tends to protect the micronized sulphur particles in the suspension and also prevents urea solidification by dilution, such that when the mixture is in free flowing fluid state and is injected into the granulator (such as through a nozzle), there is a relatively or generally homogeneous application of urea and micronized sulphur particles on the granules. The heat naturally generated during the urea solidification process tends to further evaporate any or all remaining water in the mixture of urea and micronized sulphur particles, and thus allowing elimination of the need for a dedicated drying equipment for the formed granules.

BRIEF DESCRIPTION OF THE DRAWINGS

The foregoing and other aspects of the invention will become more apparent from the following description of specific embodiments thereof and the accompanying drawings that illustrate, by way of example only, the principles of the invention.

DETAILED DESCRIPTION

The description that follows, and the embodiments described therein, are provided by way of illustration of an example, or examples, of particular embodiments of the principles of the present invention. These examples are provided for the purposes of explanation, and not limitation, of those principles and of the invention. It will be appreciated that numerous specific details have been provided for a thorough understanding of the exemplary embodiments described herein. However, it will be understood by those of ordinary skill in the art that the embodiments described herein may be practiced without these specific details. In other instances, well-known methods, procedures, apparatus, equipment and components have not been described in detail so as not to obscure the embodiments described herein. Furthermore, this description is not to be considered so that it may limit the scope of the embodiments described herein in any way, but rather as merely describing the implementation of the various embodiments described herein.

The terminology used herein is for the purpose of describing particular embodiments only and is not intended to be limiting of example embodiments of the invention. Terms and phrases used in this specification have their ordinary meanings as one of skill in the art would understand. Such ordinary meanings may be obtained by reference to technical dictionaries, such as Hawley's Condensed Chemical Dictionary 14$^{th}$ Edition, by R. J. Lewis, John Wiley & Sons, New York, N.Y., 2001.

As used herein, the singular forms "a," "an," and "the" are intended to include the plural forms as well, unless the context clearly indicates otherwise.

The phrase "and/or" should be understood to mean "either or both" of the elements so conjoined, i.e., elements that are conjunctively present in some cases and disjunctively present in other cases. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The term "weight percent," ".%," "percent by weight," "% by weight," wt. %, "% (wt.)" and variations thereof, refer to the concentration of a substance as the weight of that substance divided by the total weight of the composition containing that substance, and multiplied by 100.

As will be understood by those of ordinary skill in the art, all numbers, including those expressing quantities of reagents or ingredients, properties such as molecular weight, reaction conditions, and so forth, are approximations and are understood as being optionally modified in all instances by the term "about". These values can vary depending upon the desired properties sought to be obtained by those ordinarily skilled in the art utilizing the teachings of the descriptions herein. It is also understood that such values inherently contain variability necessarily resulting from the standard deviations found in their respective testing measurements.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Although the disclosure has been described with reference to certain specific embodiments, various modifications thereof will be apparent to those of ordinary skill in the art. Any examples provided herein are included solely for the purpose of illustrating the disclosure and are not intended to limit the disclosure in any way. Any drawings provided herein are solely for the purpose of illustrating various aspects of the disclosure and are not intended to be drawn to scale or to limit the disclosure in any way. The scope of the claims appended hereto should not be limited by the preferred embodiments set forth in the above description, but should be given the broadest interpretation consistent with the present specification as a whole.

As used herein, a "fertilizer material" is any substance that includes any one of a primary macronutrient, secondary macronutrient or a micronutrient, or combinations thereof.

In an embodiment, there is a method of preparing a fertilizer material comprising:
  a) preparing and maintaining molten urea at a suitable temperature for injection into a granulator;
  b) preparing and maintaining a suspension of micronized sulphur particles with at least 20% water (wt.) content, with a relatively uniform micronized particle size distribution, for injection into the granulator;

c) prior to injection into the granulator, combining the urea and micronized sulphur suspension, wherein the water content of the suspension cools the mixture of urea and micronized sulphur suspension, and the micronized sulphur particles substantially remain in solid state; and d) spraying the mixture of urea and micronized sulphur suspension into a granulator using a nozzle where about 20% (wt.) of the water content in the mixture of urea and micronized sulphur suspension is flashed off, wherein the granulator forms micronized sulphur-urea granules with a relatively uniform distribution of urea and micronized sulphur particles.

In some embodiments, the method may include combining the urea and micronized sulphur suspension in a tee connector in close proximity upstream of the spray nozzle located inside the granulator body. The contact time between the two streams may be kept to a minimum, such as, for example, under one second or a suitable time in order to prevent the micronized sulphur particles melting once coming into contact with the molten urea or the urea stream solidifying in the feed line.

The amount of time for combining the molten urea and micronized sulphur suspension can be controlled by the flow rate of each in the feed lines to a tee connector, and the arrangement and distance between the tee connector and nozzle(s) spraying the mixture in the granulator.

In some embodiments, the molten urea may be prepared by feeding urea prills or granules into a urea melter at a constant flow rate. In other embodiments, the molten urea may come from a urea reactor. The urea melter or reactor can maintain the molten urea at a stable temperature, preferably at a temperature of at least 135° C. The molten urea may be transferred from the urea melter or reactor to the granulator using a closed impeller, steam-jacketed centrifugal pump, equipped with a totally enclosed fan-cooled electric motor. Remelting urea prills or granules tends to form an increased amount of biuret, which tends to be an undesirable compound in the final product. In such cases the residence time of molten urea in the urea melter or reactor can be reduced or biuret suppressing agents can be added into the urea melt.

In some embodiments, the molten urea may be prepared by using a commercial urea production process that is mainly provided by but not limited to the following manufacturers: Stamicarbon (Netherlands), Snam Progetti Saipem (Italy), Toyo (Japan) or Urea Casale (Italy), or others. While various commercial urea production process licensors use varying processes to manufacture urea, the final step involves the production of urea melt that may be further granulated to produce the desired granular fertilizer product by using one of the granulation methods further described below. In some embodiments, the molten urea, or urea melt, may be provided directly from a urea plant without the need for storage in a urea tank, which tends to result in more stable biuret content.

In some embodiments, the suspension of micronized sulphur particles with water may be prepared by mixing micronized elemental sulphur and water containing a dispersant. For example, the micronized sulphur particles may be formed by a method such as that described in U.S. Pat. Nos. 8,679,446 and 9,278,858 or PCT/CA2019/051904, the entire contents of which are incorporated herein by reference. The suspension of micronized sulphur particles with water may be transferred to the granulator using a positive displacement progressive cavity-type pump.

In some embodiments, up to 85% (wt.) molten sulphur is added to superheated water and maintained above the melting point of sulphur with a dispersant in a concentration of about 0.01% (wt.) to about 5.0% (wt.). The mixture is then blended or agitated to form a fine emulsion of sulphur in water. Rapid flash cooling of the emulsion by pressure reduction results in solidification of the sulphur, which remains suspended in the dispersant solution, forming a solid/water suspension of micronized sulphur. After solidification of the micronized sulphur, the dispersant may remain in solution and assists in preventing agglomeration or aggregation of the sulphur particles. The micronized sulphur in this solid/water suspension may then be used directly in tee connection and granulator or separated from the dispersant solution to produce sulphur particles coated with a layer of dispersant. These sulphur particles may then be re-suspended and additional dispersant solution may be added if needed and directly used as a suspension of micronized sulphur particles with at least 20% water (wt.) for mixing with molten urea in their injection into a granulator.

The dispersant may be a naphthalene sulfonate compound such as that found in MORWET® or carboxymethylcellulose (CMC), or any surfactant that aids in keeping the molten sulphur in a highly dispersed state prior to solidification. The dispersant may be an anionic, cationic, amphoteric, or non-ionic surfactant, or combinations thereof. Suitable anionic surfactants include, but are not limited to, lignin derivatives such as lignosulphonates, aromatic sulphonates and aliphatic sulphonates and their formaldehyde condensates and derivatives, fatty acids/carboxylates, sulphonated fatty acids and phosphate esters of alkylphenol-, polyalkyleryl- or alkyl-alkoxylates. Suitable cationic surfactants include, but are not limited to, nitrogen-containing cationic surfactants. In one embodiment, the dispersant comprises a non-ionic surfactant. Suitable non-ionic surfactants include, but are not limited to, alkoxylated fatty alcohols, alkoxylated fatty acids, alkoxylated fatty ethers, alkoxylated fatty amides, alcohol ethoxylates, nonylphenol exthoxylates, octylphonel ethoxylates, ethoxylated seed oils, ethoxylated mineral oils, alkoxylated alkyl phenols, ethoxylated glycerides, castor oil ethoxylates, and mixtures thereof.

Figure 2:
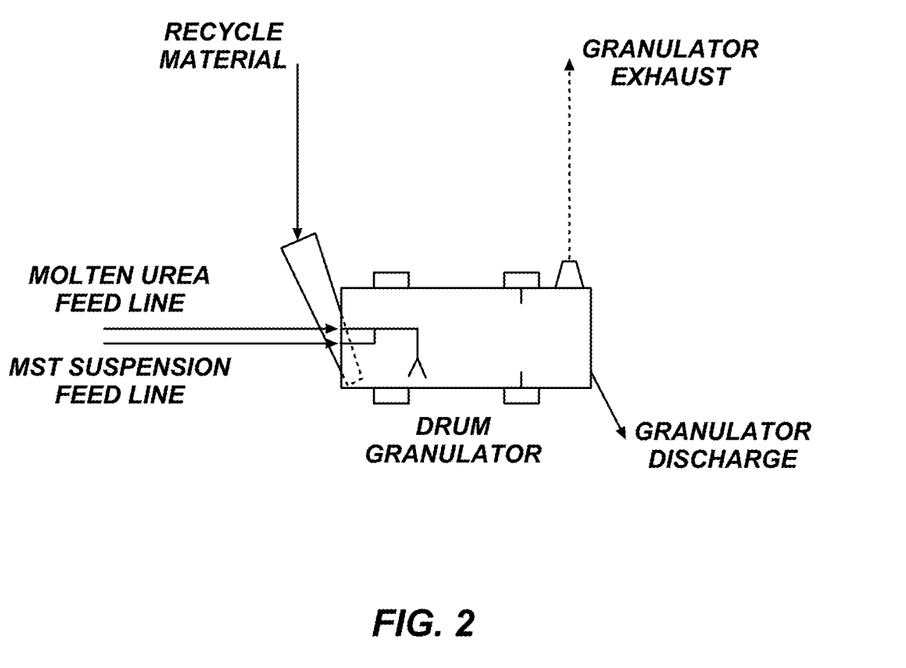
FIG. 2 shows a schematic representation of an exemplary urea and micronized sulphur feed line system for injection into a granulator in an embodiment.

Referring to FIG. 2, there is a molten urea and micronized sulphur suspension feed system that provides for their combination and discharged through a common spray nozzle into a granulator. In some embodiments, a tee-connection may be installed in the delivery lines of the molten urea and micronized sulphur suspension. One end of the tee-connection may be connected to the delivery line of the suspension of micronized sulphur with water, and another end connected to the feed line for molten urea, with an output end of the tee-connection being connected to one or more spray nozzle(s) of the granulator. The tee-connection allows the molten urea and suspension of micronized sulphur particles with water to mix before being sprayed into a granulator. Other connectors may be used in other embodiments, such as, for example, a Y connector, or other fluid mixing connectors and systems. The type of connector used and placement of the connector in relation to the granulator body may be determined based on the suitable contact time between the molten urea and micronized sulphur suspension feed streams to prevent the micronized sulphur particles melting once coming into contact with the molten urea or the urea stream solidifying in the feed line.

The presence of water in the mixture of urea and micronized sulphur particles tends to provide a temperature decrease upon combination of the molten urea with the micronized sulphur suspension and the micronized sulphur particles substantially remain in solid state. The water content tends to protect the micronized sulphur particles in the suspension and also prevents urea solidification by dilution, such that when the mixture is in free flowing fluid state and is injected into the granulator (such as through a nozzle), there is a relatively or generally homogeneous application of urea and micronized sulphur particles on the granules.

The mixture of urea and suspension of micronized sulphur particles with water may be applied using any conventional prilling or granulating method and equipment, such as a prill tower, rotating drum, pan granulator, spherodizer or a fluidized bed. For example, equipment that maintains a constantly moving bed of solid particles will tend to encourage the relatively uniform application of a spray coating. A granulator such as a rotating drum, pan granulator or fluidized bed granulator may be used in some embodiments.

In some embodiments, a nozzle is used to spray the mixture of urea and suspension of micronized sulphur particles with water such that about 20% (wt.) of the water content in the mixture is flashed off during the spraying process.

In some embodiments the mixture of urea and suspension of micronized sulphur particles with water may be simply dribbled on to a bed of circulating solids or showered from a perforated device or spinning device to form free falling drops under gravity inside tall towers like a prill tower.

In some embodiments, the suspension of micronized sulphur particles with water may be separately sprayed or dribbled alongside of molten urea directly on a bed of circulating solid bed of granules as in the case of a drum granulator, without mixing in the feed line. The suspension of micronized sulphur particles with water feed line may be separately run adjacent to the molten urea feed line and sprayed through a nozzle or simply dribbled. The mixing of molten urea and suspension of micronized sulphur particles with water may then occur on the bed of circulating solids inside the drum granulator. The substantial heat of urea crystallization from solidifying urea would be transferred to the bed of circulating solids, which would then evaporate the water present in the suspension of micronized sulphur particles to form hard granules. The fast bed of circulating solids may help mix both molten urea and micronized sulphur particles well enough to form substantially homogenous granules. This method is additionally advantageous as it may not involve any modification to an existing urea process.

In the case of a rotating drum granulator, spray nozzles may be located closer to the bottom of the drum over a bed of circulating solid granules. Nozzle location may be chosen to keep the spray carry over to a minimum, maximize water evaporation and promote the spreading out of the spray to not be focused over a small area. The spray nozzles may be oriented in any direction that aids a uniform coating of the mixture of urea and suspension of micronized sulphur particles and prevents the nozzles from getting plugged. The drum may optionally include agitating blades or ribs to assist turning over the bed of solid particles.

In the case of a fluidized bed granulator, spray nozzles may be located under or inside the bed of fertilizer materials in order to avoid or minimize carry over by flowing air to the baghouse. Higher air velocities in a fluidized bed results in a higher fraction of carry over if the nozzles are located outside the bed. Orienting the nozzles suitably, for instance, horizontally with a slight downward incline, may avoid plugging of the distribution plate and choking of the nozzle hole due to solid deposition.

In some embodiments, the micronized sulphur particles may have an average diameter of less than about 30 microns, preferably less than about 7 microns, and more preferably less than about 5 microns.

In some embodiments, the micronized sulphur-urea granules do not need to be further processed through a dedicated drying equipment as the heat released during the solidification process of the urea evaporates the remaining water content introduced from the suspension of micronized sulphur particles with water. In some embodiments additional heat may be introduced in the form of hot air flowing through the granulation process to aid faster evaporation of water. In some embodiments, de-humidified air could be passed through the granulation equipment and the product granule cooling equipment to aid efficient evaporation of water from the granules.

In some embodiments, there is a sulphur-urea fertilizer composition obtained or obtainable by the methods described herein.

Examples—The following examples are intended solely to illustrate specific embodiments of the invention, and not to limit the claimed invention.

Example 1—Pilot Plant Schematic

Figure 1:
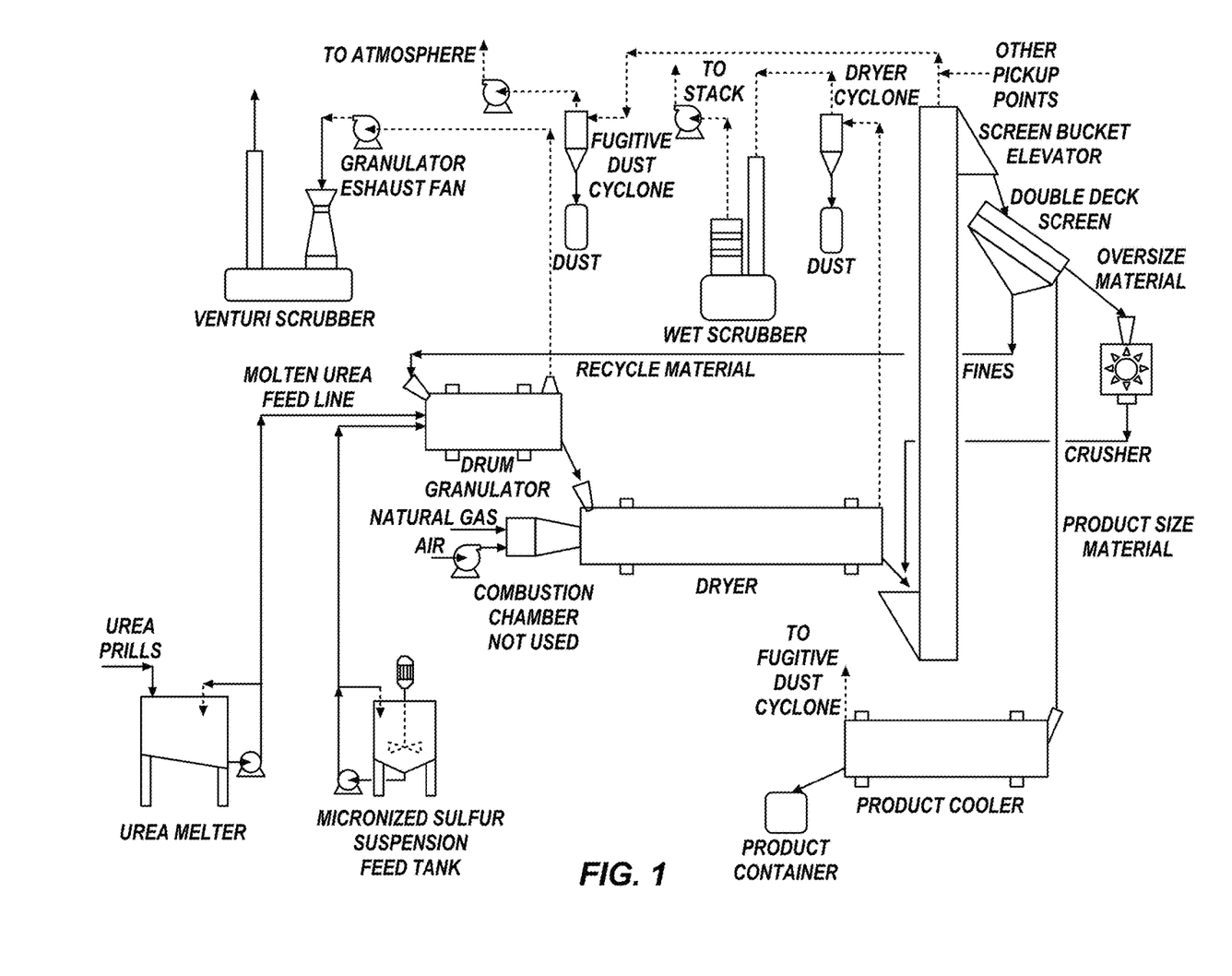
FIG. 1 shows a schematic representation of an exemplary fertilizer plant of an embodiment.

FIG. 1 shows a schematic representation of a fertilizer production pilot plant implementing an embodiment of the present invention. In this example, urea prills are melted in the urea melter and maintained at a temperature of at least 135° C. The molten urea is transferred from the urea melter to the drum granulator via the molten urea feed line.

Micronized elemental sulphur and water containing 1.25% surfactant (wt.) are mixed and poured into the micronized sulphur suspension feed tank. The homogeneous suspension is agitated with an electric-driven agitator with four blades, two-tier impellers, and a JABSCO® positive displacement gear-type pump to recirculate the suspension into the tank. The micronized sulphur particles have an average diameter preferably less than about 30 microns, preferably less than about 7 microns, and more preferably less than about 5 microns. The suspension of micronized sulphur particles with water is transferred to the drum granulator via the feed line using a MOYNO® positive displacement progressive cavity-type pump.

The plant granulator in the embodiment is a rotary drum-type granulator, about 92 cm in diameter and about 180 cm long. A 15 cm retaining dam is located 25.4 cm from the discharge end of the granulator. The granulator is operated at a 1.5-degree (°) angle of inclination from the horizontal.

Gases drawn from the granulator are treated in a once-through venturi-type scrubber. The scrubbing system uses water as the scrubbing media. The scrubbing system consists of a reinforced polyester venturi-type scrubber, a recirculation seal tank, a centrifugal pump, and a fan.

From the drum granulator, granular material is discharged by gravity into a rotary drum-type dryer utilized as a throughput cooler. The throughput cooler was operated with a co-current ambient temperature airflow. The throughput cooler is operated at a 2.0° angle of inclination from the horizontal.

A cyclone-type dust collector is located in the process air duct between the dryer discharge and the dryer fan. The dryer fan exhaust duct is connected to a wet scrubber. This scrubbing system uses water as the scrubbing media. The scrubbing system consists of a recirculation tank, a scrubber liquor recirculating pump, and a fan.

A bucket elevator is used to transfer the material from the throughput cooler to an inclined double-deck, mechanically vibrated screening system. The screen housing is fitted with an oversized screen and an undersized screen to yield a product in the 2.36 mm to 4.00 mm size range. Oversized material from the screening system is routed to a chain mill. The crushed material discharging from the chain mill is returned to the screening system. Undersized material from the screening system is returned (recycled) to the granulator along with a controlled fraction of the product-size material, when necessary, to maintain granulation control. The product-size fraction from the screening system is transferred to a product cooler that is operated with a co-current airflow vented to the fugitive dust collection system. From the product cooler, the product-size material discharged into bags or hoppers.

The plant is equipped with a fugitive dust collection system. This system consists of a network of pickup ducts connected to a cyclone-type dust collector. The dust collector receives the dust from the elevators, screening system, and conveyors. A centrifugal fan exhausts the air into the atmosphere.

Example 2—Delivery System for Molten Urea and Suspension of Micronized Sulphur Particles with Water The suspension of micronized sulphur particles with water is transferred to the drum granulator via the feed line made of 1.27 mm 316 stainless steel diameter tubing. The micronized sulphur suspension feed tank also contains a line to bypass the suspension of micronized sulphur particles with water into the tank with an on/off valve for each line to block flow in either direction. The bypass line allows control of the flow rate of the suspension of micronized sulphur particles with water and provide a way to measure the flow rate going to the feed tank and calculate the flow rate going to the granulator by difference.

The delivery line of the molten urea is connected to a tee-connection. One end of the tee-connection is connected to the flowing molten urea and the branch line is connected to the suspension of flowing micronized sulphur in water, and the other end of the tee-connection is connected to a spray nozzle, such as a WHIRLJET® hollow cone spray nozzle No. 10, which is located 32 cm from the granulator feed end and 35 cm from the wall of the granulator. The tee-connection allows the molten urea and suspension of micronized sulphur particles with water to mix before being sprayed into a granulator.

Example 3—Delivery of Molten Urea and Suspension of Micronized Sulphur Particles with Water to the Granulator and Test Results The delivery of urea and suspension of micronized sulphur particles with water to the granulator was tested twice (7-1308 and 7-1309) using the conditions provided in Table 1 below.

TABLE 1

Summary of Test Data Generated During Production of Granular Urea-Micronized Sulphur Particles

| | Test Identification | |
|---|---|---|
| | 7-1308 | 7-1309 |
| Calculated Production Rate, kg/h | 344 | 360 |
| Urea Melter: Feeds | | |
| Urea Prills, kg/h | 272 | 308 |
| Conditions | | |
| Molten Urea Temperature, °C. | 135 | 132 |
| Drum Granulator: Feeds | | |
| Suspension of Micronized Sulphur Particles with Water, kg/h | 111.5 | 80.5 |
| Molten Urea, kg/h | 310-320 | 310-320 |
| Conditions | | |
| Bed Temperature, °C. | 46 | 55 |
| Recycle Temperature, °C. | 25 | 26 |
| Recycle-to-Product Ratio | 5.6 | 3.0 |
| Rotational Speed, rpm | 20 | 20 |
| Drum Speed, fraction of critical speed, % | 45 | 45 |
| Dryer: Conditions | | |
| Throughput, kg/h | 1,826 | 1,370 |
| Natural Gas, kg/h | 0.0 | 0.0 |
| Combustion Chamber Temperature, °C. | 38 | 31 |
| Material Discharge Temperature, °C. | 30 | — |
| Exhaust Gases Temperature, °C. | 25 | 26 |
| Rotational Speed, rpm | 8 | 10 |
| Drum Speed, fraction of critical speed, % | 18 | 21 |
| Product Cooler: Conditions | | |
| Material Discharge Temperature, °C. | 22 | 26 |
| Ambient Conditions: | | |
| Temperature (min./max.), °C. | 15/19 | 12/17 |
| Relative Humidity (min./max.), % | 41/55 | 64/71 |

Total Sulphur Monitoring

Dust samples were collected for both tests 7-1308 and 7-1309 at the dryer elevator exhaust duct, dryer and the fugitive dust cyclones inlet ducts to determine the dust load and total sulphur content of each stream as shown in Table 2. In addition, the dust collected at each cyclone underflow was weighed, sampled, and chemically analyzed. The purpose of this analyses was to monitor the total sulphur content during the plant operation and compare this with the total sulphur content in the product. The chemical analyses and amount of dust collected from the underflow of each cyclone are found in Table 3.

Test 7-1308

The suspension of micronized sulphur particles with water was pumped to the granulator at maximum pump speed with the valve of the return line closed; then molten urea was pumped into the granulator. Once the spray into the granulator was steady, the flow rates of molten urea and suspension of micronized sulphur particles with water were adjusted to the targeted values. Two samples of the spray suspension were collected and submitted for chemical analyses, which showed a total solids content of 9.0% and 9.1% (wt.), respectively. Table 2 below illustrates the dust and sulphur concentrations of the various airstreams sampled. Table 3 below illustrates the results of the chemical analyses and amount of dust collected during the test. A total of 169 kg of dust was collected, of which 129 kg was from the dryer cyclone underflow and 40 kg was from the fugitive dust cyclone underflow.

During the last 10 minutes of the test, three different pump settings for the suspension of micronized sulphur particles with water were tested with the valve of the return line closed. The pump was set at 100 rpm, 50 rpm, and 35 rpm holding the molten urea setting steady at 59% of the scale. After approximately five minutes at each speed setting, a sample of the spray suspension of molten urea and suspension of micronized sulphur particles with water was collected and sent for chemical analyses. The results showed that the elemental sulphur content of the samples was 24.2%, 14.6% and 10.2% (wt.), respectively. Based on these results, other flow rates for test 7-1309 were selected.

TABLE 2

Dust Concentrations of the Various Airstreams Sampled

| Test Number | Sample Location | Dust Per Volume of Air (g/m$^3$) | Total Sulphur Content (%) | Total Sulphur Concentration in Airstream (g/m$^3$) |
|---|---|---|---|---|
| 7-1308 | Dryer Elevator | 4.91 | 16.34 | 0.80 |
| | Dryer Cyclone Inlet | 6.67 | 13.19 | 0.88 |
| | Fugitive Dust Cyclone Inlet | 0.80 | 19.44 | 0.16 |
| 7-1309 | Dryer Elevator | 6.37 | 17.50 | 1.11 |
| | Dryer Cyclone Inlet | 22.82 | 8.37 | 1.91 |
| | Fugitive Dust Cyclone Inlet | 0.80 | 16.33 | 0.13 |

TABLE 3

Chemical Analyses and Amount of Dust Collected from the Cyclone Underflow

| Test Number | Location | Sample No. | Chemical Analysis$^a$ (%) Total Nitrogen | Total Sulphur | Moisture$^b$ | Amount of Dust Collected (kg) |
|---|---|---|---|---|---|---|
| 7-1308 | Dryer | 1 | 40.3 | 11.95 | 0.17 | 106 |
| | | 2 | 38.4 | 14.62 | 0.33 | 23 |
| | Fugitive Dust | 3 | 39.8 | 14.27 | 0.06 | 40 |
| 7-1309 | Dryer | 1 | 41.8 | 9.58 | 0.18 | 121 |
| | | 2 | 42.6 | 8.67 | 0.21 | 387 |
| | Fugitive Dust | 3 | 39.3 | 14.03 | 0.34 | 45 |

$^a$Chemical analyses were performed according to the Association of Official Analytical Chemists (AOAC) methods except total nitrogen and total sulphur, which were analyzed using an International Fertilizer Development Center (IFDC) method in a combustion analyzer.
$^b$Moisture content was determined using the vacuum desiccator method.

Test 7-1309

The suspension of micronized sulphur particles with water was pumped to the granulator at a pump speed of 100 rpm; then the molten urea was pumped into the granulator. The pump speed of the micronized sulphur particles with water was slowly decreased to 45 rpm, then subsequently increased to 50 rpm to increase the concentration of elemental sulphur. The flow of molten urea was also increased proportionally to obtain a target of 10% (wt.) elemental sulphur in the final product. The flow rate of molten urea fluctuated between 310 kg/h and 320 kg/h. The flow rate of the suspension of micronized sulphur particles with water varied from 74.4 kg/h to 87.4 kg/h, where the flow rate was calculated based on the amount of the suspension of micronized sulphur particles with water fed into the system in a specific period. Table 2 above illustrates the dust and sulphur concentrations of the various airstreams sampled. Table 3 above illustrates the results of the chemical analyses and amount of dust collected during the test. A total of 553 kg of dust was collected, of which 508 kg was from the dryer cyclone underflow and 45 kg was from the fugitive dust cyclone underflow.

Chemical Analysis

Chemical analyses of selected samples from each test were performed according to the Association of Official Analytical Chemists (AOAC) methods. The results of the chemical analyses are shown in Table 4 below. In addition, moisture content of samples in various process streams were also determined as shown in Table 5 below.

TABLE 4

Chemical Analyses of Samples Produced in the Plant

| Test Number | Sample No.$^a$ | Chemical Analysis$^b$ (%) Total Nitrogen | Total Sulphur | Biuret | Moisture$^c$ |
|---|---|---|---|---|---|
| 7-1308 | 1 | 35.7 | 18.1 | 6.58 | 2.56 |
| 7-1309 | 1 | 40.5 | 11.6 | —$^d$ | 1.76 |
| | 2 | 38.1 | 13.7 | 4.51 | 2.43 |

$^a$Sample 1 for test 7-1308 was collected at end-of-day, and samples 1 and 2 for test 7-1309 were collected at mid-day and end-of-day, respectively.
$^b$Chemical analyses were performed according to the AOAC methods except total nitrogen and total sulphur, which were analyzed using an IFDC method in a combustion analyzer.
$^c$Moisture content was determined on an unground sample using the vacuum desiccator method for test 7-1308. Moisture content of samples 1 and 2 of test 7-1309 were determined on an unground sample using the vacuum oven method and vacuum desiccator method, respectively.
$^d$Chemical analysis was not performed.

The total sulphur content of sample 1 for test 7-1308 was 18.1% (wt.). For test 7-1309, the total sulphur content of sample 2 was 13.7% (wt.).

TABLE 5

Moisture Content of Samples in Various Process Streams

| Test Number | Sample No. | Moisture Content of Different Process Streams$^a$ (%) Recycle | Granulator | Dryer/Cooler | Product |
|---|---|---|---|---|---|
| 7-1308 | 1 | —$^b$ | — | — | — |
| | 2 | 2.63 | 3.49 | 2.67 | 2.56 |
| 7-1309 | 1 | 1.28 | 1.65 | 1.40 | 1.76 |
| | 2 | 2.04 | 2.80 | 2.45 | 2.43 |

$^a$Moisture content of sample 1 for both tests was determined using the vacuum oven method on an unground sample. Moisture content of sample 2 for both tests was determined using the vacuum desiccator method on an unground sample. Composite samples were collected during the last hour of operation.
$^b$Samples were not collected.

The moisture content increased as more suspension of micronized sulphur particles with water was fed to the system. Despite the moisture content being above 1.0% (wt.), the product seemed hard to the touch. Measurements taken during plant operation using a moisture analyzer showed moisture values for the granulator discharge ranging between 0.1% (wt.) and 1.2% (wt.). These values are used for process control as a guide to adjust the process variables. During the tests, the ambient humidity was high, which lead to higher level of moisture in the product.

The biuret content of the samples was high because of the residence time of the molten urea in the urea melter. It is well known to those skilled in the art that the biuret content rapidly rises as the urea melt is held longer in storage or in feed lines. Samples of the urea prills fed to the urea melter and the molten urea were analyzed for biuret content. All of the samples of molten urea were taken 30 minutes prior to completion of tests. Biuret content of urea prills was 0.36% (wt.). Biuret content of the molten urea from tests 7-1308 and 7-1309 was 7.66% (wt.) and 4.20% (wt.), respectively.

Examples of Physical Properties

Physical properties tests were performed on the product samples from tests 7-1308 and 7-1309 according to the Manual for Determining Physical Properties of Fertilizer (IFDC R-10). The selected physical properties determined were size analysis by dry sieving method (IFDC S-107, procedure 1), granule crushing strength (IFDC S-115), abrasion resistance (IFDC S-116), critical relative humidity (IFDC S-101), and moisture absorption-penetration (IFDC S-100). Prior to conducting the size analyses, crushing strength and abrasion resistance determinations, the samples were dried in a convection oven at 80° C. until the laboratory reported a moisture content lower than 0.5% (wt.). All samples were dried to 0.0% (wt.) moisture content. The results of the physical properties tests performed on the selected products are shown in Table 6 below.

TABLE 6

Physical Properties of Products

| Physical Property | Sample Identification | |
| --- | --- | --- |
|  | Test 7-1308 | Test 7-1309 |
| Size Analysis$^a$ (Cumulative Percentage Retained on Screen) | | |
| 4.00 mm | 23.0 | 20.1 |
| 3.35 mm | 43.0 | 43.4 |
| 2.80 mm | 72.8 | 79.7 |
| 2.36 mm | 97.4 | 99.3 |
| 2.00 mm | 99.6 | 99.7 |
| 1.70 mm | 99.7 | 99.8 |
| Size Guide Number (SGN) | 322 | 325 |
| Granule Crushing Strength$^b$ (−2.80 mm +2.36 mm fraction) | | |
| Average, kg/granule | 2.87 | 2.34 |
| Range, kg/granule | 1.95-4.45 | 1.75-3.20 |
| Abrasion Resistance$^c$ (% degradation) | 0.77 | 0.66 |
| Critical Relative Humidity$^d$ (%) | 75-80 | 75-80 |
| Moisture Absorption-Penetration$^e$ (72 hours @ 30° C., 80% RH) | | |
| Moisture Absorption, mg/cm$^2$ | 110.47 | 142.15 |
| Moisture Penetration, cm | 3.16 | 2.49 |
| Moisture-Holding Capacity, mg/cm$^3$ | 34.94 | 59.72 |
| Moisture-Holding Capacity, % | 4.32 | 7.58 |
| Granule Integrity, wet | Poor | Poor |

$^a$Determined according to the procedure (IFDC S-107) described in *Manual for Determining Physical Properties of Fertilizer* (IFDC-R-10).
$^b$Determined according to the procedure (IFDC S-115) described in *Manual for Determining Physical Properties of Fertilizer* (IFDC-R-10).
$^c$Determined according to the procedure (IFDC S-116) described in *Manual for Determining Physical Properties of Fertilizer* (IFDC-R-10).
$^d$Determined according to the procedure (IFDC S-101) described in *Manual for Determining Physical Properties of Fertilizer* (IFDC-R-10).
$^e$Determined according to the procedure (IFDC S-100) described in *Manual for Determining Physical Properties of Fertilizer* (IFDC-R-10).

Size Analysis

Size analysis of fertilizer products is defined as the particle diameter range of the material. It is typically measured by sieving, a process of separating a mixture of particles according to their size fraction. The size analysis of the products shows that between 76.6% and 79.6% of the material was between 2.00 mm and 4.00 mm, for samples collected from tests 7-1308 and 7-1309, respectively. The size guide number (SGN) is the diameter, expressed as millimeters ×100, of the fertilizer granules based on the median (or mid-point) within the sample. It means that half of the fertilizer granules are larger than the stated SGN and half are smaller. This is determined by passing the fertilizer through various sieves and using the amounts retained by each. The SGN values of the sulphur-urea products varied from 322 to 325 for samples from tests 7-1308 and 7-1309, respectively. The SGN is a result of the granulation process and the screen sizes utilized in the screening system of the granulation plant.

Granule Crushing Strength Examples

Crushing strength is defined as the minimum force required to crush individual particles. Crushing strength is measured by applying pressure to individual granules, usually of a specified size range (−2.80 mm to +2.36 mm), and recording the pressure required to fracture each granule. Granule crushing strength is useful in predicting the expected handling and storage properties of a granular fertilizer and determining the pressure limits that can be applied during bag and bulk storage. The crushing strength of the micronized sulphur-urea products ranged between 2.34 kg/granule and 2.87 kg/granule as shown in Table 6 above. In commercial production, crushing strength of urea granules can be increased by adding a binding agent, which is mostly a formaldehyde based chemical. However, the urea prills that were procured for trials were animal feed grade urea, which did not contain formaldehyde-based binder. Binder chemical was not added as the product had sufficient granule crushing strength even in the absence of binder chemical. If desired, the addition of a binder chemical would increase the granule crushing strength of the granules.

Abrasion Resistance

Abrasion resistance is the resistance to the formation of dust and fines and to granule fracturing as a result of granule-to-granule and granule-to-equipment contact during handling. Abrasion resistance is determined by measuring the percentage of dust and fines (percentage of degradation) created by subjecting a sample to abrasive action. The abrasion resistance values for the micronized sulphur-urea products varied from 0.66% to 0.77% degradation in tests 7-1309 and 7-1308, respectively, as shown in Table 6 above.

Critical Relative Humidity

Critical relative humidity (CRH) is defined as the relative humidity of the atmosphere at which a material will absorb moisture from the atmosphere and below which it will not absorb moisture from the atmosphere. The CRH for products from tests 7-1308 and 7-1309 was between 75% and 80% as shown in Table 6 above. The CRH values are not affected by the presence of micronized sulphur.

Moisture Absorption-Penetration

Hygroscopicity is the degree to which a material will absorb moisture from the atmosphere. Hygroscopicity of fertilizers is important when considering conditions under which a bulk pile can be stored as well as material flowability during handling and field application. Fertilizer materials vary in their ability to withstand physical deterioration (wetting and softening) when exposed to a humid atmosphere. Even materials with about the same CRH often behave differently as a result of differences in "moisture-holding capacity"; therefore, determination of CRH alone is not sufficient to indicate the hygroscopicity of a fertilizer.

The hygroscopicity of fertilizers is compared by imposing various periods of humid exposure on samples contained in completely filled open-top glass cups. The hygroscopicity tests consist of: (1) moisture absorption, which is the rate of moisture pickup per unit of exposed surface; (2) moisture penetration, which is the depth of moisture penetration (visible wetting of the material); (3) moisture-holding capacity, which is the amount of moisture that individual particles of fertilizer will absorb before allowing moisture to be transferred by capillary action to adjacent particles; and (4) integrity of wetted granules, which is determined qualitatively by handling the top surface layer of a sample after it has been exposed to a humid atmosphere. The granule integrity is then rated as excellent, good, fair, or poor. Granule integrity is a qualitative observation based on the strength of the top surface layer of granules after exposure for 72 hours. A rating of "excellent" indicates no signs of degradation, and "good" indicates slight degradation of material. With a rating of "fair," the material has degraded but a solid core remains. A rating of "poor" indicates that the material no longer maintains its original shape.

All moisture absorption-penetration values for urea-micronized products from tests 7-1308 and 7-1309 are shown in Table 6 above. The moisture absorption values for the sulphur-urea products were between 110.47 milligrams per square centimeter (mg/cm2) and 142.15 mg/cm2. The moisture penetration depth of the sulphur-urea products ranged between 2.49 cm and 3.16 cm. The moisture-holding capacity for the granular sulphur-urea products was between 33.76 milligrams per cubic centimeter (mg/cm3) and 59.72 mg/cm3. The granule integrity of the wetted granules was poor for all products.

Figure 3:
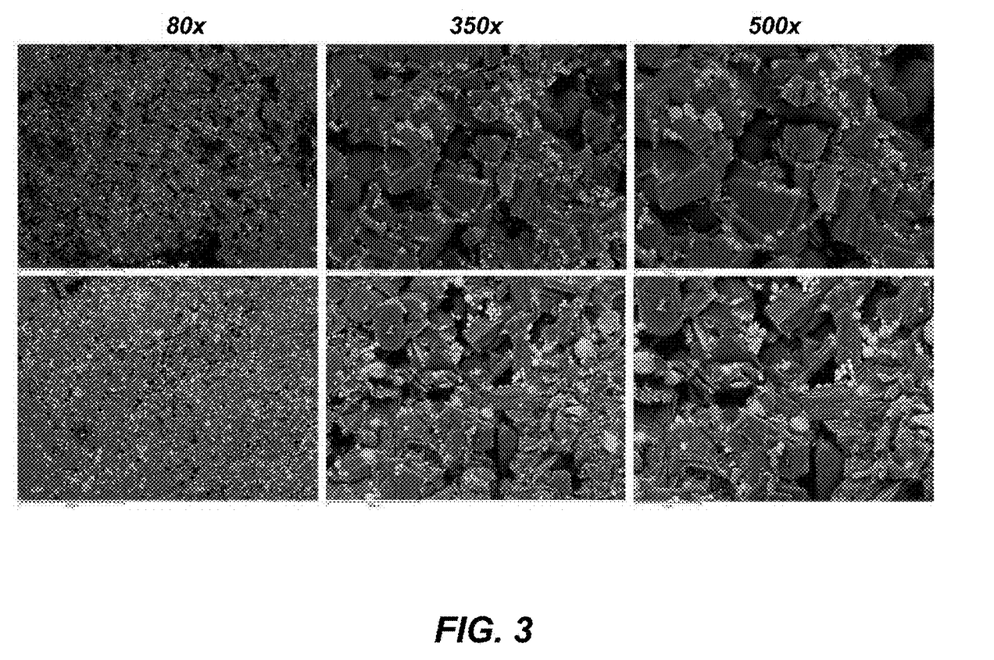
FIG. 3 shows a Scanning Electron Micrograph (SEM) of the urea-micronized sulphur granule produced in accordance with an embodiment, taken at 80×, 350× and 500× magnification.
Figure 4:
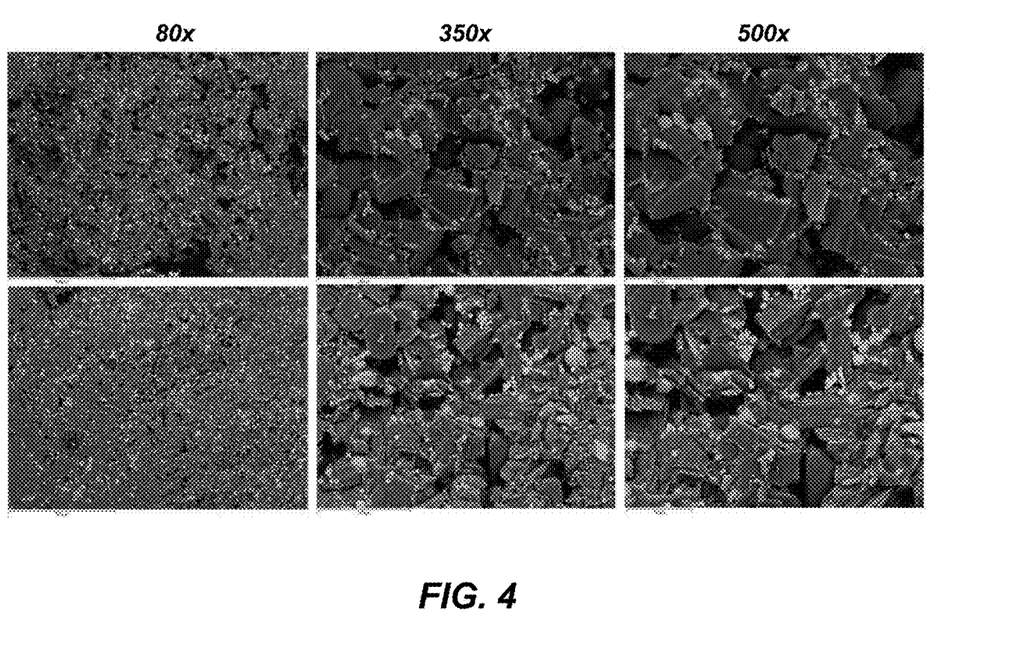
FIG. 4 shows a Scanning Electron Micrograph (SEM) and Energy Dispersive X-ray of the urea-micronized sulphur granule produced in accordance with an embodiment, taken at 80×, 350× and 500× magnification.

Scanning Electron Micrographs (SEM) and Energy Dispersive X-Ray (EDX) Imaging of Granules In accordance with an exemplary embodiment, granular samples were randomly selected and carefully cut in half using a sterile surgical blade. Each granule was individually cut to a flat half and was mounted on a sample holder using a carbon tape. The samples were then coated with a thin layer (10-15 nm) of gold to help reduce sample charging and to improve the image quality. Coated samples were then placed to the sample holder of the SEM instrument for analysis at magnifications (80×, 350× and 500×) as illustrated in FIG. 3. An EDX imaging of sulphur in combination with the SEM imaging was also obtained at magnifications (80×, 350× and 500×) as illustrated in FIG. 4. In this example, the area/field of view of the granule were all randomly selected to prevent fixation on a certain area as well as to prevent sample degradation over time. The SEM and SEM/EDX micrographs demonstrate that the micronized sulphur particles are homogeneously distributed throughout the urea-micronized sulphur granule as illustrated by the sulphur particles, which are shown in white/light grey in FIGS. 3 and 4.

While the foregoing invention has been described in some detail for purposes of clarity and understanding, it will be appreciated by those of ordinary skill, once they have been made familiar with this disclosure, that various changes in form and detail can be made without departing from the true scope of the invention in the appended claims. The invention is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described.

What is claimed is:

1. A method of producing a sulphur-urea fertilizer granule, comprising the steps of:
    a) preparing and maintaining molten urea at a suitable temperature for injection into a granulator;
    b) preparing and maintaining a suspension of micronized sulphur particles with at least 20% water content, with a relatively uniform micronized particle size distribution, for injection into the granulator;
    c) prior to injection into the granulator, combining the urea and micronized sulphur suspension, wherein the water content of the suspension cools the mixture of urea and micronized sulphur suspension, and the micronized sulphur particles substantially remain in solid state; and
    d) spraying the mixture of urea and micronized sulphur suspension into a granulator using a nozzle where about 20% wt. of the water content in the mixture of urea and micronized sulphur suspension is flashed off, wherein the granulator forms micronized sulphur-urea granules with a relatively uniform distribution of urea and micronized sulphur particles.

2. The method of claim 1, wherein the urea and micronized sulphur suspension are combined in a tee connection proximal to the entry into the granulator.

3. The method of claim 2, wherein the water content of the micronized sulphur suspension cools the mixture of urea and micronized sulphur suspension without solidification of urea.

4. The method of claim 3, wherein the urea is maintained at a temperature of at least 135° C. before its combination with the micronized sulphur suspension.

5. The method of claim 4, wherein the preparation and maintaining of the urea is in a urea reactor in fluid communication with the tee connection.

6. The method of claim 5, wherein the micronized sulphur particles have an average diameter of less than about 30 microns.

7. The method of claim 6, wherein the micronized sulphur particles have an average diameter of less than about 7 microns.

8. The method of claim 7, wherein the micronized sulphur particles have an average diameter of less than about 5 microns.

9. The method of claim 8, wherein the sulphur-urea fertilizer granules are produced without a further drying step in a dedicated drying equipment.

10. A sulphur-urea fertilizer composition obtained by:
    a) preparing and maintaining molten urea at a suitable temperature for injection into a granulator;
    b) preparing and maintaining a suspension of micronized sulphur particles with at least 20% water wt. content, with a relatively uniform micronized particle size distribution, for injection into the granulator the suspension further comprising a surfactant;
    c) prior to injection into the granulator, combining the urea and micronized sulphur suspension, wherein the water wt. content of the suspension cools the mixture of urea and micronized sulphur suspension, and the micronized sulphur particles substantially remain in solid state;
    d) spraying the mixture of urea and micronized sulphur suspension into a granulator using a nozzle where about 20% wt. of the water content in the mixture of urea and micronized sulphur suspension is flashed off, wherein the granulator forms micronized sulphur-urea granules with a relatively uniform distribution of urea and micronized sulphur particles; and e) forming the granules of sulphur-urea fertilizer composition without a further drying step in a dedicated drying equipment, wherein the granulator forms sulphur-urea granules with a relatively uniform distribution of urea and micronized sulphur particles.

* * * * *